United States Patent [19]
Vignini et al.

[11] 3,809,829
[45] May 7, 1974

[54] ACOUSTIC CROS HEARING AID

[75] Inventors: Walter R. Vignini, Peelskill; Martin Molloy, Ossining, both of N.Y.

[73] Assignee: Sonotone Corporation, Elmsford, N.Y.

[22] Filed: Jan. 16, 1973

[21] Appl. No.: 324,102

[52] U.S. Cl. .................................... 179/107 S
[51] Int. Cl. .................................... G02c 11/06
[58] Field of Search .................. 179/107 S, 107 FD

[56] References Cited
UNITED STATES PATENTS
2,946,394  7/1960  Smith.......................... 179/107 S

*Primary Examiner*—Ralph D. Blakeslee
*Attorney, Agent, or Firm*—Ostrolenk, Faber, Gerb & Soffen

[57] ABSTRACT

An eyeglass CROS hearing aid having temple bars one of which has the operative elements of a hearing aid and an acoustic passage from the operative temple bar through said temple bar, the eyeglass frame and the other temple bar to either an earpiece mountable on the other temple bar or an acoustic opening for the microphone.

7 Claims, 6 Drawing Figures

PATENTED MAY 7 1974 3,809,829
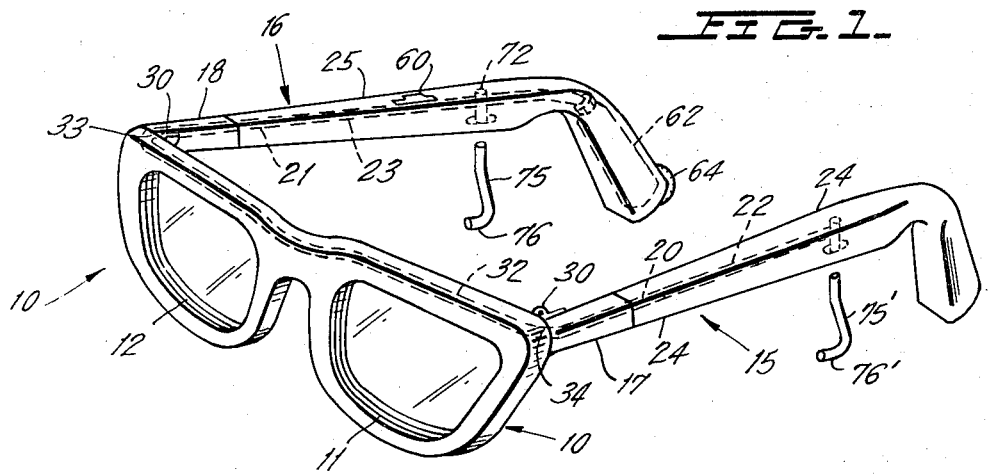

ACOUSTIC CROS HEARING AID

The present invention relates to hearing aids and particularly to eyeglass supported hearing aids of the CROS type in which sound picked up at one ear is delivered to the other ear after having been amplified.

CROS type performance can be achieved either electrically or acoustically.

In the electrical type of CROS eyeglass hearing aid some of the elements are located or carried in one of the temple bars and other elements are carried in the opposite temple bar with appropriate electrical connections between the two temple bars. The electrical connections from one temple bar to the other temple bar are made through the eyeglass frame itself.

In the acoustic type of CROS hearing aid one form of which is the subject of the instant invention, sound is transferred from one side to the other via an acoustic passage through the temple bars and eyeglass frame.

The present invention is directed to the provision of a simplified easily manufactured and conveniently usable acoustic type of CROS hearing aid construction for eyeglass hearing aids.

In prior attempts to obtain an acoustic crossover so that the hearing aid elements mounted on one side of the head might also be used to produce sound by acoustic transmission to the other side of the head, various types of tubes, ducts, pipes or passages have been used; the acoustic tubes were hinged to form temple bars and complex hinges with acoustic passages were required. In such cases the eyeglasses were merely an appendage to the passage or tube or pipe construction and were merely attached thereto apparently as an afterthought (see for instance prior Smith U.S. Pat. No. 2,946,394).

The present invention has for its principal object the formation of such an acoustic passage from one temple bar to the other temple bar of an eyeglass hearing aid wherein the acoustic passage is entirely contained within an apparently normal and usual eyeglass frame and where even the hinge construction of the eyeglass frame may be of the normal and usual type for eyeglasses while nevertheless preserving the integrity and continuity of the acoustic passage while the eyeglasses are being worn.

Another object of the present invention is the provision, in an eyeglass hearing aid frame having detachable and remountable temple bars, of an acoustic passage from one temple bar through the eyeglass frame to the other temple bar which nevertheless permits the removal and remounting of the temple bars.

Still another object of the present invention is the provision in an eyeglass frame having acoustic passages from one temple bar through the eyeglass frame to the other temple bar of an acoustic passage connector at the hinge of the temple bar so arranged that the acoustic passage is connected when the eyeglass temple bars are unfolded to the wearing position and remains so connected until the eyeglasses are removed from the wearer's head and folded once more for storage.

A further object of the present invention is the provision in an eyeglass frame of acoustic passages from one temple bar through the eyeglass frame to the other in which the eyeglass frame is provided with an acoustic passage terminating at each end in an opening adjacent the hinge for the temple bar and each temple bar is provided with a corresponding acoustic passage terminating in an opening at the respective hinges. The openings on each side are so arranged that, when the temple bars are open to a position substantially normal to the hinge, the eyeglass wearing position, they are interconnected and a complete acoustic passage is formed from one temple bar through the eyeglass frame to the other temple bar.

The foregoing and many other objects of the present invention will become apparent in the following descriptions and drawings in which:

FIG. 1 is a view in perspective of the novel eyeglass frame.

FIG. 2 is a bottom view of the eyeglass frame of FIG. 1.

FIG. 3 is a cross-sectional view taken on line 3—3 of FIG. 2 showing the acoustic passage in the eyeglass frame.

FIG. 4 is a cross-sectional view taken on line 4—4 of FIG. 2 showing the acoustic passage in a portion of the temple bar.

FIG. 5 is an enlargement of one of the hinge structures shown in FIG. 2 showing how the acoustic passages of the temple bar in the eyeglass frame are interconnected.

FIG. 6 is a view corresponding to that of FIG. 5 showing the relationship of the parts when the temple bar is folded toward the eyeglass frame for storage thereby showing how the acoustic passages are disconnected during storage.

Referring now to FIGS. 1 and 2 the eyeglass hearing aid is provided with a frame 10 having appropriate means 11, 12 for mounting lenses. The left-hand temple bar 15 is in this case operated or energized only by the acoustic cross means hereinbefore mentioned and hereinafter described. The right-hand temple bar 16 has all of the operating elements of the hearing aid including part of the acoustic passage.

Each of the temple bars is provided with a short hinge section 17 (for temple bar 15) and 18 (for temple bar 16) having a longitudinal tube 20, 21 therein. The tubes 20 and 21 respectively extend rearwardly beyond the short sections 17 and 18 and cooperate with the tubes 22 and 23 of the temple bar sections 24, on the left side, and 25, on the right side. Each of the tubes 20 and 21, therefore, by extending into their respective tubes 22 and 23 operate to support temple bar sections 24 and 25, while at the same time, as hereinafter described, forming part of a complete acoustic passage.

If no other means for orientation is provided then the tubes 20 and 21 may at the portions thereof which extend rearwardly of the hinged sections 17 or 18 be slightly oblong in section and the portion of the cooperating tube passages 22 and 23 in temple bar sections 24 and 25 may be similarly oblong in section in order to provide and retain orientation between the removable temple bar sections 24 and 25 and the hinge temple bar sections 17 and 18 while the eyeglasses are in use.

The construction of the temple bars 15 and 16 consists of hinge sections 17 and 18 and operating sections so that the glasses may be appropriately sized with respect to the length of the temple bar required. That is, the hearing aid consultant may be provided with a number of hinge sections 17 and 18 of different lengths so that provision is therefore made for users of different size. The said sections 17 and 18 may be secured by the hinges hereinafter described to the eyeglass frame either by the consultant or by the optometrist who fits the lenses in the glasses and completes the structure.

As will be seen from FIGS. 2, 5 and 6 the hinge sections 17, 18 of the temple bars 15, 16 are connected by a usual eyeglass hinge 30 to the upper and outer portions of the frame 10 on each side. The frame 10 is provided through its upper section with an acoustic passage 32 which terminates in the openings 33 on one side and 34 on the other side. The hinges 30 are secured to the frame just inside the respective openings 33 and 34 so that when the temple bars 15 and 16 are folded toward the glasses in the ususal carrying or storage position as opposed to the wearing poisition the temple bars 15 and 16 and their respective hinge sections 17 or 18 will move from the position of FIG. 5 shown for the hinge section 18 to the position of FIG. 6.

The openings 33, 34 for the transverse passage 32, through the eyeglass frame are directed toward the rear of the eyeglass frame and are located just outside the hinges 30. The tubes 20 and 21, as seen particularly in FIGS. 5 and 6, extend forwardly at 40 just beyond the hinged section 18 (in FIG. 6) of the temple bars. When the glasses are unfolded from the position of FIG. 6 to the position of FIG. 5 the ends 40 of the tubes 20 and 21 enter slightly into the openings 33, 34 of the transverse passage 32 through the eyeglass frame.

An O-ring type of gasket 45 is located preferably on the frame itself, in an appropriate recess 46, at each of the openings 33, 34 to the passage 32 through the eyeglass frame. When the glasses are unfolded from the position of FIG. 6 to the position of FIGS. 5, 2 or 1, the forward surface 47 of the hinged sections 17 and 18 compress the O-ring gasket 45 providing an appropriate seal for the acoustic passage which is formed, this seal being maintained by the fact that the glasses are being worn on the head of the user.

A complete acoustic passage is thereby formed from temple bar 16 to temple bar 15, the passage consisting of the tube 23 in the temple bar section 25, the tube 21 in hinge bar section 18, the gasketed connection between tube section 40 and opening 33, the passage 32 through the frame, the gasketed connection between tube 20 and opening 34 and the connection between tube 20 and passage 22 and temple bar section 24.

In the CROS type eyeglass hearing aid here shown the temple bar 16 is the active temple bar having all of the necessary hearing aid elements. It is provided with a battery receptacle 60, a microphone 61, appropriate amplifier circuity 62 with appropriate electrical connections between elements 60, 61, 62, with an on-off switch 63 also appropriately electrically connected to the amplifier and a volume control 64 operating an appropriate element of the amplifier 62. The amplifier section 62 is provided with a transducer (receiver) 70 which is connected by tubes 71 to the vertical acoustic passage 72 in section 25 of temple bar 16. The vertical tubes 72 extend to a nipple 73 on the lower side of temple bar section 16. An appropriate removable acoustical connector 75 may be connected to the nipple 73; the said connector 75 having an end 76 which may be introduced into the ear or be connected to an appropriate ear mold for insertion in the ear. With this arrangement where amplified sound from the receiver 70 is fed into the ear located on the same side as the receiver, sound pick up must come from the opposite side and this is accomplished by an acoustic connection of microphone 61 through tube 23 etc. to the opposite temple. The microphone opening in such case could be terminated at any point or points including the tubing 75' which could be located in the ear for natural sound pick up.

The vertical tube 72 may instead be connected to the passage 23 and consequently the receiver energy which is transmitted to the tube 72 is in turn transmitted to the passage 23 in temple bar section 25 of the temple bar 16. This acoustic energy then passes through tube 21, the gasketed opening 33 in the frame 10, the passage 32 of frame 10, the gasketed opening 34 of frame 10, the tube 20 in temple bar section 17 of temple bar 15 and the passage 22 of temple bar section 15 to a vertical tube 72' which may as was described in the case of the vertical tube 72 be connected to an appropriate connector 75' for the other ear on the other side of the head.

With this arrangement where amplified sound from the receiver 70 is fed into the ear located on the opposite side of the head from the receiver, sound pick up must be from the side of the head where the receiver 70 is located. This is accomplished by having microphone 61 open to the outside of temple 25.

Thus either the microphone input signal or the amplified receiver signal may be crossed over to the acoustic path described by the instant inventors.

Since the tube 21 in temple bar section 18 is open so that its end 40 is visible when the frame is folded open, appropriate attenuator slugs may be inserted in the tube opening 40 or in the frame opening 33 to control passage of sound through the acoustic passages in the frame and temple bars to the ear piece 75'.

By this means therefore a simplified acoustic crossover arrangement is provided whereby all of the operating elements in one of the temple bars may be connected by a complete continuous acoustic passage to the opposite temple bar element, the acoustic passage being so arranged that it is fully integrated and a continuous passage when the eyeglass hearing aid is open and worn by the user. All of the advantages of prior eyeglass hearing aids including the ability to size the hearing aid, the temple bars, and the ability to remove and replace either of the temple bar sections are preserved.

Where, therefore, an acoustic type of crossover is found to be desirable rather than an electrical type of crossover the system of the present invention provides a simplified easily manufactured means for obtaining such a crossover while nevertheless preserving the integrity of the sound system and the integrity of the eyeglasses as eyeglasses while of course preserving the appearance of the eyeglasses as eyeglasses, rather than, as was apparently necessary in prior devices, the creation of an apparatus which is complicated in appearance and therefore repellent as far as any wearer with aesthetic taste is concerned.

In the foregoing the invention has been described only in connection with preferred illustrative embodiments thereof. Since many variations and modifications will now be obvious to those skilled in the art it is preferred that the scope of this invention be defined, not by the specific disclosures herein contained but, only by the appended claims.

The embodiments of the invention in which an exclusive privilege or property is claimed are defined as follows:

1. An eyeglass hearing aid having a frame and a temple bar on each side;

microphone, energy supply, amplifier and sound transducing means carried in one of said temple bars;

each temple bar having a longitudinal acoustic passage therein;

the sound transducing means in said one of said temple bars being connected to the acoustic passage in said temple bar;

a connection in each temple bar from the acoustic passage therein to the exterior of said temple bar for transmitting sound from said passage exteriorly thereof, a hinge on each side of said frame, each temple bar being connected to one of the hinges on each side of said frame and being rotatable from a position substantially normal to the frame toward a position substantially parallel to said frame, an acoustic passage through said frame;

said acoustic passage on each side terminating outside said hinge in an opening directed toward the rear of said frame, the end of each temple bar at each hinge extending in a plane outside said hinge, said end engaging the frame when said temple bars are opened to the said position substantially normal to said frame, the acoustic passage in each temple bar terminating in the region of said plane and engaging a corresponding opening in the acoustic passage of said frame when the temple bars are opened to the said position substantially normal to said frame and forming a complete continuous acoustic passage from the transducer in said one temple bar through said one temple bar through the frame to the other temple bar including the said connections to the exterior in each temple bar.

2. The eyeglass hearing aid of claim 1 in which an acoustic sealing means is provided at each hinge area between the said end of the acoustic passage in each temple bar and the said corresponding opening in the acoustic passage of said frame.

3. The eyeglass hearing aid of claim 2 in which said sealing means comprises an O-ring secured at each said opening of the acoustic passage of said frame.

4. The eyeglass hearing aid of claim 1 in which each temple bar comprises two sections including a hinge section and a main section; said hinge section of each temple bar being connected to said hinge; each of said sections having a longitudinal acoustic passage; a tube projecting from the acoustic passage of one of said sections toward the other section and being receivable in the acoustic passage of the other section, the main section being thereby removably mounted on said hinge section.

5. The eyeglass hearing aid of claim 2 in which each temple bar comprises two sections including a hinge section and a main section; said hinge section of each temple bar being connected to said hinge; each of said sections having a longitudinal acoustic passage; a tube projecting from the acoustic passage of one of said sections toward the other section and being receivable in the acoustic passage of the other section, the main section being thereby removably mounted on said hinge section.

6. The eyeglass hearing aid of claim 1 in which the acoustic passage in each temple bar includes a section projecting beyond said plane thereof adjacent the hinge, said projecting section entering the corresponding opening of the frame acoustic passage when the temple bars are opened to said position substantially normal to the plane of the frame.

7. The eyeglass hearing aid of claim 3 in which the acoustic passage in each temple bar includes a section projecting beyond said plane thereof adjacent the hinge, said projecting section entering the corresponding opening of the frame acoustic passage when the temple bars are opened to said position substantially normal to the plane of the frame.

* * * * *